(12) United States Patent
Bischoff et al.

(10) Patent No.: US 6,920,795 B2
(45) Date of Patent: Jul. 26, 2005

(54) ADAPTER FOR COUPLING A SENSOR TO A FLUID LINE

(75) Inventors: Brian Bischoff, Red Wing, MN (US); Robert Gooch, Orem, UT (US)

(73) Assignee: Red Wing Technologies, Inc., Minneapolis, MN (US)

( * ) Notice: Subject to any disclaimer, the term of this patent is extended or adjusted under 35 U.S.C. 154(b) by 605 days.

(21) Appl. No.: 10/042,511

(22) Filed: Jan. 9, 2002

(65) Prior Publication Data

US 2003/0127850 A1 Jul. 10, 2003

(51) Int. Cl.⁷ ............................................... G01L 7/00
(52) U.S. Cl. ........................................................ 73/706
(58) Field of Search .................. 73/706, 714, 715–727, 73/756, 861.43, 861.44; 210/746, 754, 755, 96.1; 137/102, 109, 115.01, 115.03, 115.11, 564.5, 861

(56) References Cited

U.S. PATENT DOCUMENTS

| | | |
|---|---|---|
| 3,967,504 A | 7/1976 | Akeley |
| 4,046,010 A | 9/1977 | Akeley |
| 4,172,387 A | 10/1979 | Ezekiel et al. |
| 4,466,290 A | 8/1984 | Frick |
| 4,527,428 A | 7/1985 | Shimada et al. |
| 4,565,096 A | 1/1986 | Knecht |
| 5,020,377 A | 6/1991 | Park |
| 5,022,271 A | 6/1991 | Hannon, Jr. |
| 5,042,495 A | 8/1991 | Spotts et al. |
| 5,375,473 A | 12/1994 | Ikeda et al. |
| 5,483,994 A | 1/1996 | Maurer |
| 5,526,784 A * | 6/1996 | Hakkenberg et al. ........ 123/322 |
| 5,672,832 A | 9/1997 | Cucci et al. |
| 5,755,559 A * | 5/1998 | Allington et al. ............. 417/53 |
| 6,055,863 A | 5/2000 | Behm et al. |
| 6,069,392 A | 5/2000 | Tai et al. |
| 6,076,409 A | 6/2000 | Bang |
| 6,270,680 B1 * | 8/2001 | Silveri et al. ................ 210/746 |

* cited by examiner

Primary Examiner—William Oen
(74) Attorney, Agent, or Firm—Robert D. Atkins; Quarles & Brady Streich Lang LLP

(57) ABSTRACT

An apparatus for sensing one or more physical characteristics of a fluid flowing in a fluid line, in one embodiment having an isolator block mounted onto a fluid line and in another embodiment, having an adapter plate coupled with isolator plate mounted onto a fluid line.

46 Claims, 9 Drawing Sheets

ADAPTER FOR COUPLING A SENSOR TO A FLUID LINE

FIELD OF THE INVENTION

The present invention relates generally to sensor packages for use in measuring physical characteristics of a fluid and, more particularly, to an adapter that is used to couple a sensor to a fluid line for measuring one or more physical characteristics of a fluid.

BACKGROUND OF THE INVENTION

Sensors are used in numerous industries to sense various physical characteristics of fluids. For example, pressure sensors can be used in a variety of configurations to measure gauge pressure, level, flow, and density of a fluid. In some cases, it may be desirable to sense the pressure of a fluid that may be harmful or corrosive to the sensor. Or, there may be some instances where it may be desirable to sense the pressure of a fluid whose purity may be compromised by exposure to the sensor.

In either of the above-described cases, it may be desirable to use a media-compatible sensor. A media-compatible sensor is one in which the sensor is isolated from the fluid whose pressure is being sensed. Typically, the sensor is isolated from the fluid using a membrane manufactured of various types of stainless steel or by using a thin Teflon® membrane covering the sensor directly. The space between the membrane and the sensor is filled with a pressure transmission fluid, such as silicone oil or water. Thus, when pressure variations of the fluid cause deflections of the membrane, the pressure transmission fluid transmits that pressure to the sensor.

Present media-compatible sensors for high purity applications of corrosive fluids suffer from several drawbacks. Such drawbacks include complexity, cost, low sensitivity, and potential for leakage across the membrane.

Hence, there is a need for media-compatible sensors and media-compatible adapters for coupling sensors to a fluid that addresses one or more of the drawbacks noted above. Namely, a sensor and adapter that is less complex, less costly, does not suffer from low sensitivity, and has a relatively low potential for leakage.

SUMMARY OF THE INVENTION

The present invention provides a reliable, relatively low complexity, high sensitivity and low cost apparatus for facilitating the measurement of multiple physical characteristics of a fluid, while maintaining structural integrity and preventing contamination of the fluid being read.

According to one aspect of the present invention, and by way of example only, an adapter for coupling a sensor to a fluid line having at least a first opening therein includes an adapter block, a retainer plate, and a first diaphragm. The adapter block includes a first fluid channel, a first input port, and a first output port. The retainer plate is coupled to the adapter block and has at least a first opening therethrough. The first diaphragm includes a first membrane portion and a first rim portion surrounding the first membrane portion. The first membrane portion is positioned within the first opening of the retainer plate and the rim portion is positioned between at least the adapter block and the retainer plate. The first diaphragm is held in place by a compression force exerted between the adapter block and the retainer plate.

Another aspect of the present invention, includes an adapter for coupling a sensor to a fluid line having at least a first opening therein. The adapter includes an isolator block and a first membrane. The isolator block has at least a first cavity and a second cavity formed therein. The second cavity is adapted for fluidly coupling to the first opening in the fluid line. The first membrane is integrally formed as part of the isolator block and physically separates the first cavity from the second cavity.

In yet another aspect of the present invention, and by way of example only, an adapter for coupling a sensor to a fluid system includes a fluid line, an isolator block and a first membrane. The fluid line includes a fluid input port, a fluid output port and a flow bore that extends from the fluid input port of the fluid output port. Further, the fluid line includes at least a first opening extending from the flow bore to a surface thereof. The isolator block has at least a first cavity and a second cavity formed therein. The second cavity is adapted for fluidly coupling to the first opening in the fluid line. The first membrane is integrally formed as part of the isolator block and physically separates the first cavity from the second cavity.

In another aspect of the present invention, and by way of example only, an adapter for coupling a sensor to a fluid line having at least a first opening includes an isolator block, a first membrane and a first spacer element. The isolator block includes at least a first cavity and a second cavity formed therein, and the second cavity is adapted for fluidly coupling to the first opening in the fluid line. The first membrane is integrally formed as part of the isolator block and physically separates the first cavity from the second cavity. The first spacer element has one or more openings that extend through the element from a first surface to a second surface and is coupled within the first cavity such that one of its first and second surfaces is positioned proximate the first membrane. The senor is in fluid communication with one of the openings in the first spacer element.

Yet another aspect of the present invention, includes a fluid line, an isolator block, a first membrane, a first spacer element and a sensor. The fluid line includes a fluid input port, a fluid output port, and a flow bore extending from the fluid input port to the fluid output port, the fluid line also includes at least a first opening extending from the flow bore to a surface. The isolator block includes at least a first cavity and a second cavity. The second cavity is adapted for fluidly coupling to a first opening in the fluid line. The first membrane is integrally formed as part of the isolator block and physically separates the first cavity from the second cavity. The first spacer element has one or more openings that extend through the element from a first surface to a second surface and is coupled within the first cavity such that one of its first and second surfaces is positioned proximate the first membrane.

In another aspect of the present invention, an apparatus for sensing one or more physical characteristics of a fluid includes a fluid line, an isolator block, a first membrane, a second membrane, a first spacer element, a second spacer element and a sensor. The fluid line includes a fluid input port, a fluid output port, and a flow bore extending from the fluid input port to the fluid output port, the fluid line also includes at least a first opening extending from the flow bore to a surface. The isolator block includes at least a first cavity, a second cavity, a third cavity and a fourth cavity formed therein. The second cavity and fourth cavity are adapted for fluidly coupling to a first opening and second opening in the fluid line. The first membrane is integrally formed as part of the isolator block and physically separates the first cavity from the second cavity. The second membrane is also integrally formed as part of the isolator block and physically separates the third cavity from the fourth cavity. The first spacer element has one or more openings that extend through the element from a first surface to a second surface and is coupled within the first cavity such that one of its first and second surfaces is positioned proximate the first membrane. The second spacer element has one or more openings that extend through the element from a third surface to a fourth surface and is coupled within the third cavity such that one of its third and fourth surfaces is positioned proximate the second membrane. The sensor is in fluid communication with one of the openings in the first spacer element and in fluid communication with one of the openings in the second spacer element.

In yet another aspect of the present invention, an adapter for coupling a sensor includes a fluid line having a first and second opening, an isolator plate, at least one membrane, an adapter plate and a first spacer element. The isolator plate includes one or more cavities formed therein adapted for fluidly coupling to a first opening in the fluid line. Further, the membrane is integrally formed as part of the isolator plate and is positioned proximate one end of the cavity. The adapter plate is coupled to the isolator plate and has a first fluid channel that has a first input port in fluid communication with the membrane and a first output port. The first spacer element is coupled within the first output port and has a second fluid channel. The second fluid channel includes a second input port in fluid communication with the first fluid channel and a second output port adapted for coupling with a sensor.

In still yet another aspect of the present invention, an adapter for coupling a sensor to a fluid line having at least a first opening includes an isolator plate, at least a first membrane, an adapter plate and a first spacer element. The isolator plate has at least a first cavity adapted for fluidly coupling to a first opening in the fluid line and an isolator membrane is integrally formed therein. The isolator membrane is positioned proximate one end of the first cavity. The adapter plate is then coupled to the isolator plate and has a first fluid channel with a first input port in fluid communication with the first membrane and a first output port. The first spacer element is then coupled with the output port and has a second fluid channel which includes a second input port in fluid communication with the first fluid channel. The first spacer element also has a second output port that is adapted for coupling with a sensor.

In yet another aspect of the present invention, an apparatus for sensing one or more physical characteristics of a fluid has an isolator plate, at least a first membrane, an adapter plate, a first spacer element, a second spacer element and a sensor. The isolator plate includes at least a first cavity formed therein adapted for fluidly coupling to a first opening in a fluid line and a second cavity formed therein adapted for fluidly coupling to a second opening in the fluid line. The at least a first membrane is integrally formed as part of the isolator plate and is positioned proximate one end of the first cavity. At least a second membrane is integrally formed as part of the isolator plate and is positioned proximate one end of the second cavity. The adapter plate is coupled to the isolator plate. The adapter plate includes a first fluid channel having a first input port in fluid communication with the first membrane and a first output port. The adapter plate includes a third fluid channel having a third input port in fluid communication with the second membrane and a third output port. The first spacer element coupled within the first output port. The first spacer element includes a second fluid channel including a second input port in fluid communication with the first fluid channel and a second output port. The second spacer element is coupled within the third output port. The second spacer element includes a fourth fluid channel having a fourth input port in fluid communication with the third fluid channel and a fourth output port adapted for coupling with the sensor. The sensor is in fluid communication with the second output port and the fourth output port.

Other features and advantages of the present invention will become apparent from the following detailed description, taken in conjunction with the accompanying drawings, which illustrate, by way of example, the principles of the invention.

DETAILED DESCRIPTION OF THE DRAWINGS

Before proceeding with the detailed description, it is to be appreciated that, as used herein, the term fluid refers to any fluid, liquid or gas, for which a physical characteristic, however generated, is to be measured.

Figure 1:
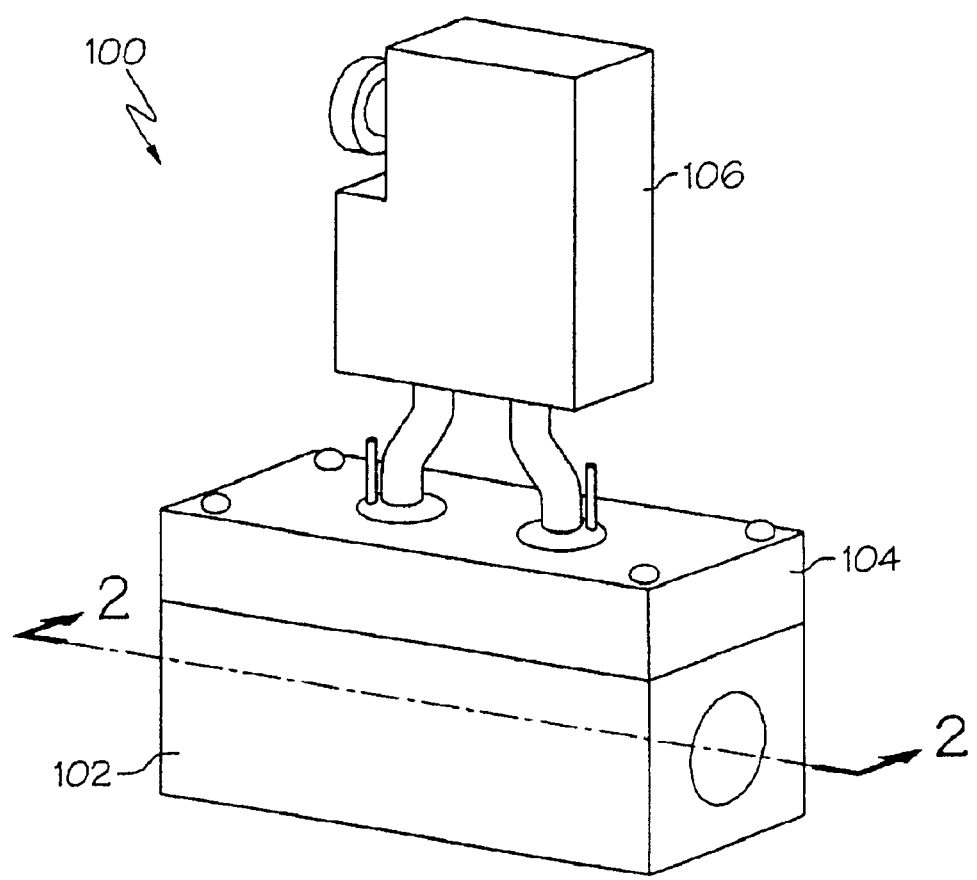
FIG. 1 is a perspective view of an adapter useful for coupling a sensor to a fluid system according to a first embodiment of the present invention.
Figure 2:
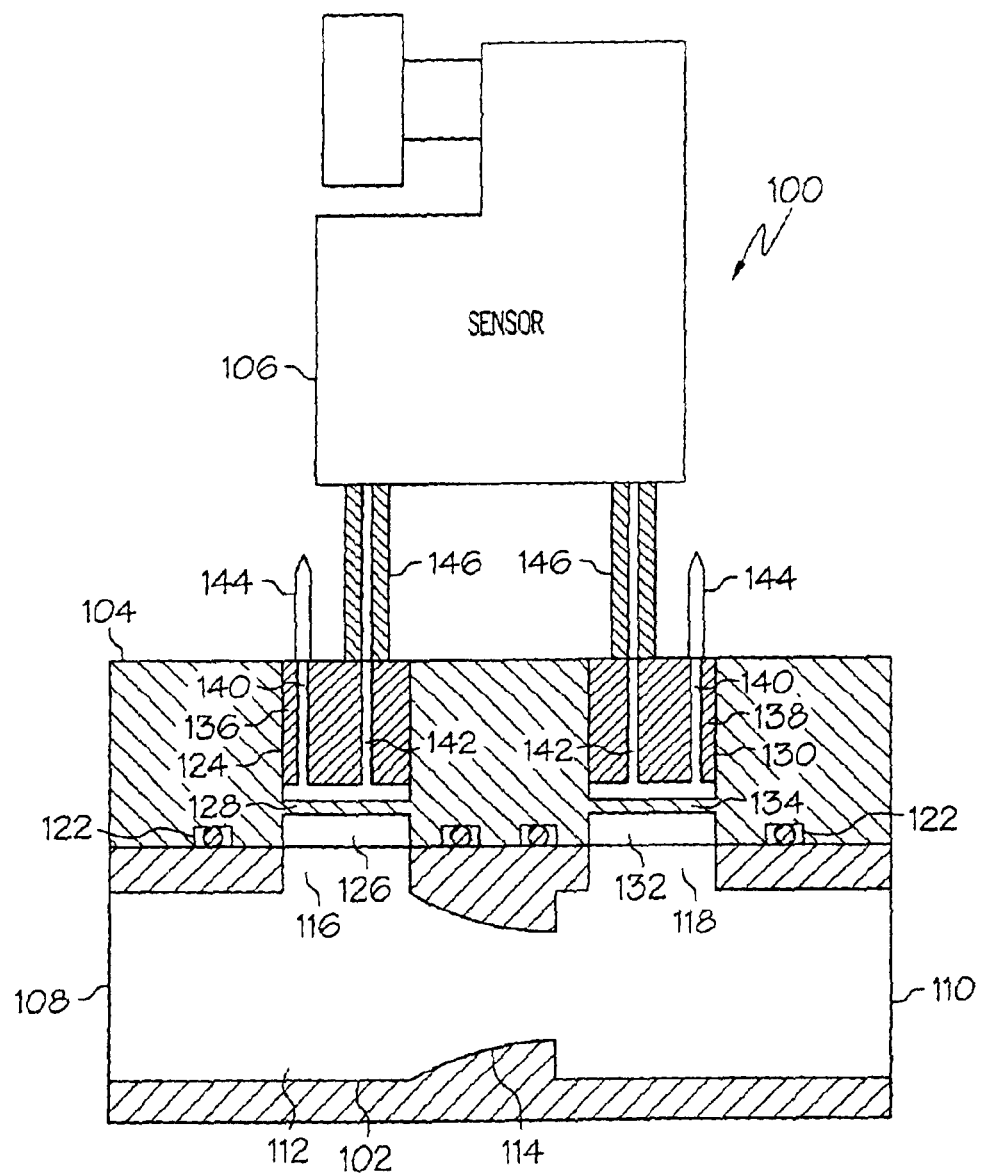
FIG. 2 is a partial cross-sectional view of the adapter taken along line 2—2 in FIG. 1.

A perspective view of an embodiment of sensor adapter 100 that is configured to allow the measurement of fluid flow rate according to an embodiment of the present invention is depicted in FIG. 1. As illustrated therein, the apparatus 100 includes a fluid line 102, an isolator block 104, and a sensor 106. With reference to FIG. 2, in combination with FIG. 1, it can be seen that the fluid line 102 includes a fluid input port 108, a fluid output port 110, and a flow bore 112. The flow bore 112 extends from the input port 108 through to the output port 110 and, in the depicted embodiment, includes an integrally formed flow restriction 114 for developing a differential pressure within the fluid line 102 to facilitate flow measurement. The skilled artisan will appreciate that the flow bore 112 may be any one of numerous known configurations that are used to measure flow including, but not limited to, a flow venturi and a flow orifice. The fluid line 102 further includes two openings, a first opening 116 and a second opening 118, that extend through a surface of the fluid line 102 to the flow bore 112. The first opening 116 is positioned upstream of the flow restriction 116 and the second opening 118 is positioned downstream of the flow restriction 116. As will be discussed further below, these openings communicate the pressure of the fluid in the fluid line 102 to the isolator block 104. A person skilled in the art would further appreciate that the flow bore 112 may be used to read density if a straight bore is used and the apparatus is mounted upright so that a predetermined height difference is established between the first 116 and second 118 openings. The skilled artisan will additionally appreciate that the sensor adapter 100 may also be similarly configured to measure fluid level.

Figure 3:
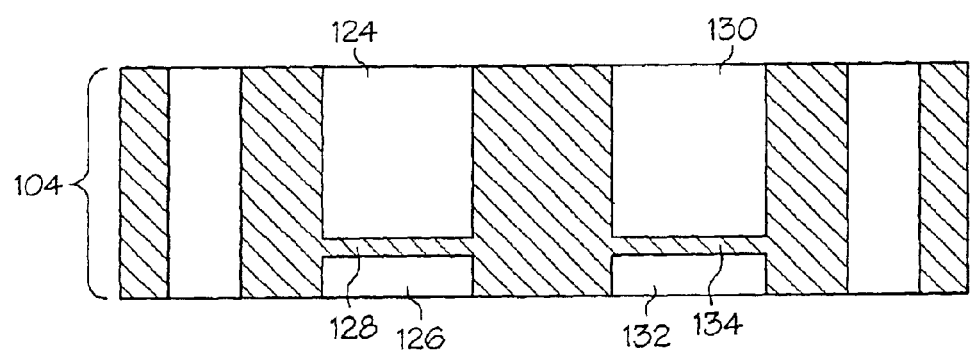
FIG. 3 is a cross section view of the isolator block used in the embodiment of FIG. 1.

The isolator block 104 is coupled to the fluid line 102 using any one of numerous means for coupling two pieces together including, but not limited to, an adhesive or two or more fasteners. In the preferred embodiment, the fluid line 102 and isolator block 104 are coupled together using any one of numerous mounting means available to secure the two together so that they may later be disconnected, if one or the other needs replacement. Thus, in the depicted embodiment, fasteners (non-illustrated) and seals 122, such as O-ring seals, knife seals, or gasket seals, are used to provide leak tight coupling between the fluid line 102 and the isolator block 104. As shown in further detail in FIG. 3, the isolator block 104 includes a first cavity 124 that is physically separated from a second cavity 126 by a first isolator membrane 128. Similarly, a third cavity 130 is physically separated from a fourth cavity 132 by a second isolator membrane 134. The first and second isolator membranes 128, 134 are integrally formed as part of the isolator block 104, by either a molding or machining process. The skilled artisan will appreciate that the surfaces of the isolator membranes 128, 134 may additionally include a plurality of convolutions, which are useful for making the isolator membranes 128, 134 more compliant for a given isolator membrane thickness. While the isolator block 104, and thus the isolator membranes 128, 134, may be comprised of any one of numerous materials. The material is preferably of a chemically inert nature, including, but not limited to, Teflon®.

Returning once again to FIG. 2, the second cavity 126 and fourth cavity 132 are preferably dimensioned substantially similar to, and are substantially collocated with, the first 116 and second openings 118, respectively, in the fluid line 102. It will be appreciated that the second 126 and fourth 132 cavities need not be dimensioned substantially similar to the first 116 and second 118 openings, nor need they be substantially collocated with the first 116 and second openings 118. The substantial similarity in size and location are merely exemplary of a preferred embodiment. The second 126 and fourth 132 cavities need only be in fluid communication with the first 116 and second 118 openings, respectively.

Figure 4:
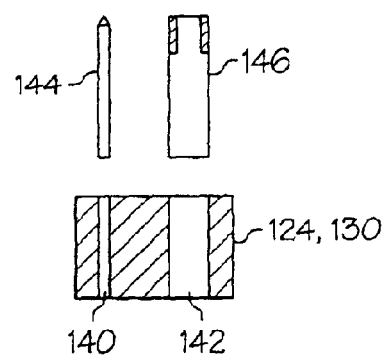
FIG. 4 is a partial cross-sectional view of an embodiment of a spacer element used in the embodiment of FIG. 1.

As FIG. 2 additionally depicts, a first spacer 136 element is preferably positioned within the first cavity 124 proximate the first isolator membrane 128, and a second spacer element 138 is preferably positioned within the third cavity 130 proximate the second isolator membrane 134. The first 136 and second 138 spacers, if included, are provided to displace much of the volume of the first 124 and third 130 cavities, so that the pressure transmission fluid (discussed further below) need not fill the entire volume of these cavities. The skilled artisan will appreciate that the spacers are not required, but are merely exemplary of a preferred embodiment. In any case, the first 136 and second 138 spacer elements, as depicted more clearly in FIG. 4, each include a first opening 140 and a second opening 142 that extend through the spacer elements 136, 138. The first opening 140 is used as a fill port to allow a pressure transmission fluid to fill the remaining volume of the first 124 and third 130 cavities that is not displaced by the spacer elements 136, 138. In this regard, a fill tube 144 may be provided to facilitate inserting the pressure transmission fluid. Once the pressure transmission fluid is fully inserted, the fill tube 144 is closed off in an airtight manner. The pressure transmission fluid may be any one of numerous substantially incompressible fluids such as water or oil.

The second opening 142 is used to couple the pressure transmission fluid from the first 124 and third 130 cavities to the sensor 106. In this regard, a sensor connection tube 146 is coupled within the second opening 142 to provide fluid communication between the first 124 and third 130 cavities and the sensor 106. The sensor connection tube 146 can be threaded, friction fit, or adhesively coupled to the sensor 106. With this arrangement, pressure variations in the fluid line 102 cause flexures of the isolator membranes 128, 134. These flexures of the isolator membranes 128, 134 in turn cause pressure variations in the pressure transmission fluid, which is transferred to the sensor 106. The data is then used to determined, for example, pressure, differential pressure, flow rate, density, or fluid level.

Figure 5:
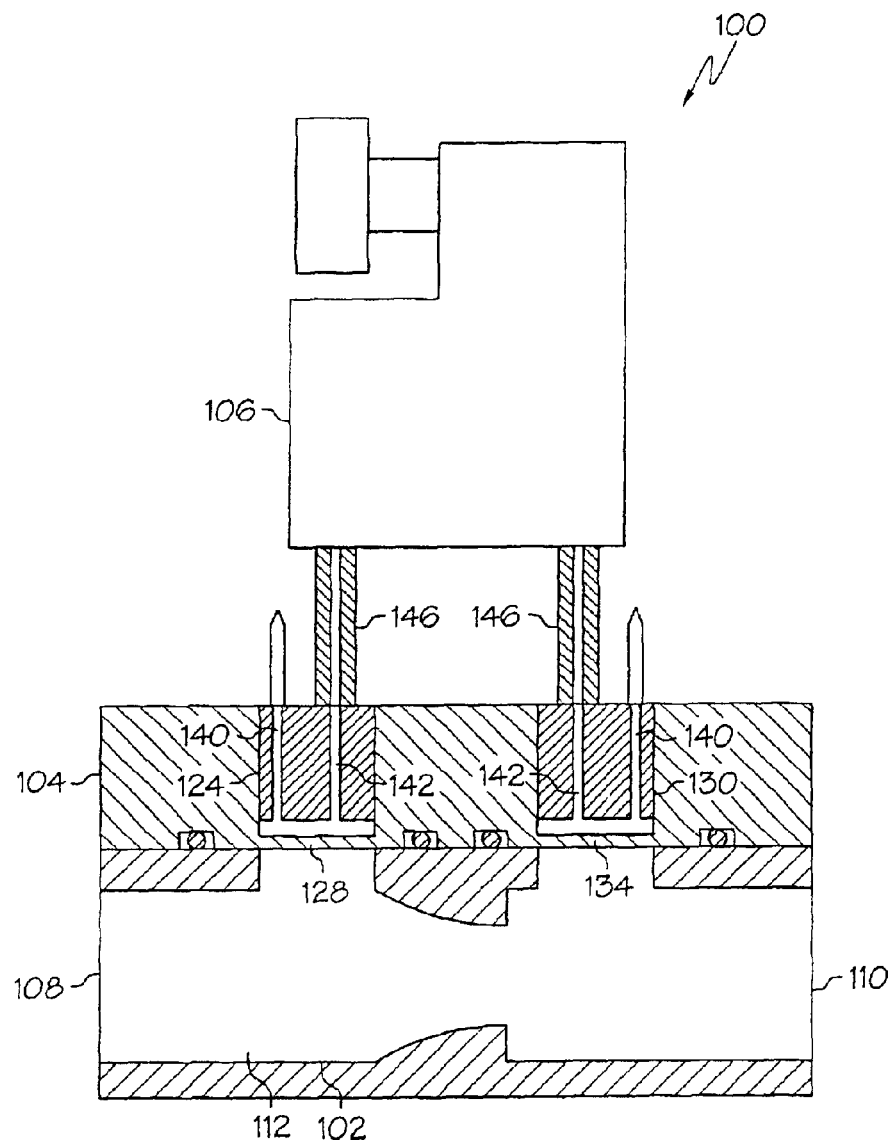
FIG. 5 is a partial cross section view of an alternative arrangement of the adapter depicted in FIG. 1.

Although the embodiment depicted in FIGS. 1 and 2 shows four total cavities, 124, 126, 130, 132 and two isolator membranes 128, 134, it is to be appreciated that the present invention is not limited to this configuration. Indeed, the present invention may include more than four total cavities and more than two isolator membranes. It will additionally be appreciated that the relative volumes of the first 124 and second 126 cavities, and the third 130 and fourth 132 cavities need not be as depicted in FIGS. 1 and 2, which is only exemplary of a preferred embodiment. Moreover, the first and second isolator membranes 128, 134 could be formed in the isolator block 104 such that the isolator block 104 includes only the first 124 and third 130 cavities, as is depicted in FIG. 5.

Figure 6:
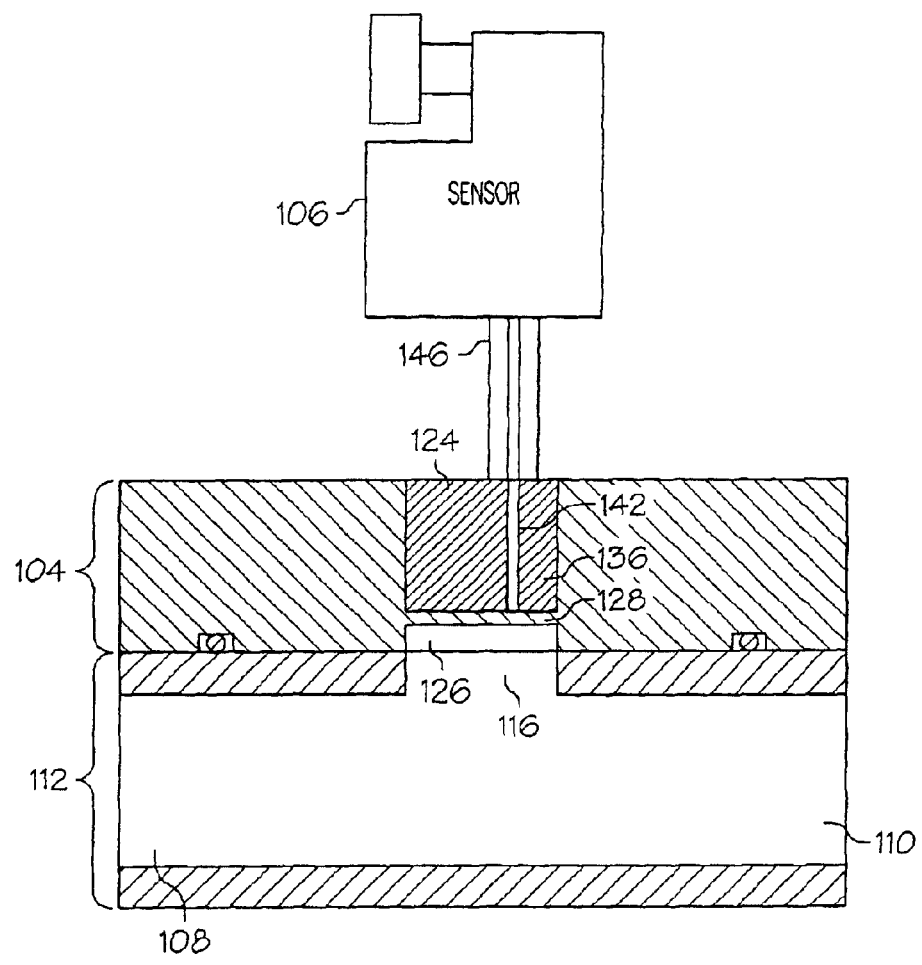
FIG. 6 is a partial cross section view of yet another arrangement of the adapter of FIG. 1 configured to measure fluid pressure.

Although the embodiments depicted and described above are configured to sense either two or more pressures or a differential pressure, it will be appreciated that the fluid line 102 and isolator block 104 may also be configured to sense only a single fluid pressure. Such a configuration is shown in FIG. 6, in which like reference numerals are used for like parts of the embodiment depicted in FIG. 1. The flow bore 112 in this particular embodiment is a straight bore.

Figure 7:
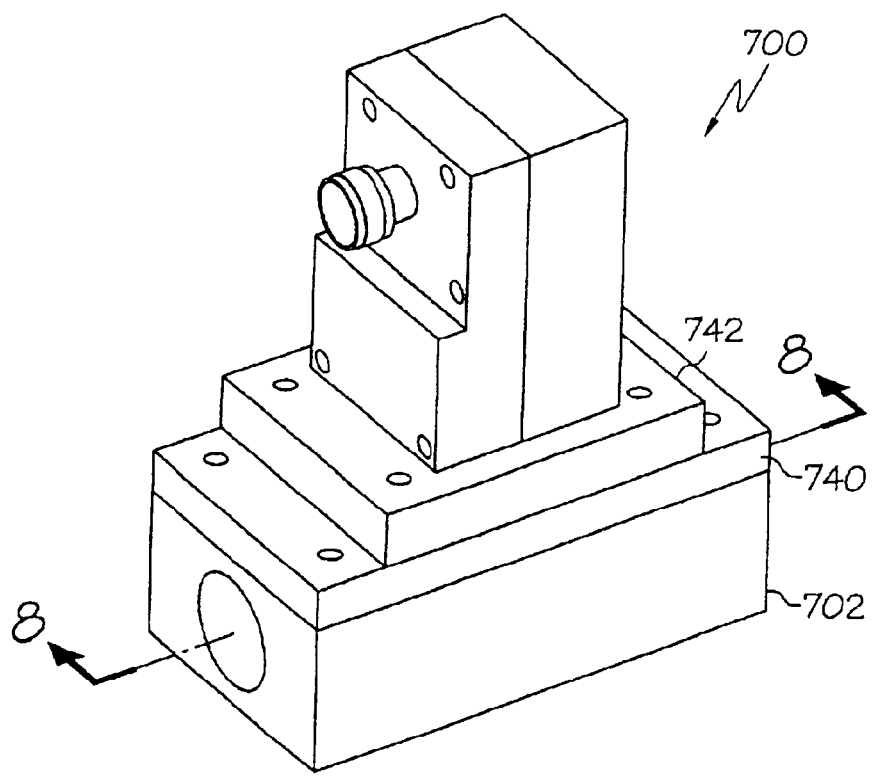
FIG. 7 is a perspective view of an adapter useful for coupling a sensor to a fluid system according to yet another embodiment of the present invention.
Figure 8:
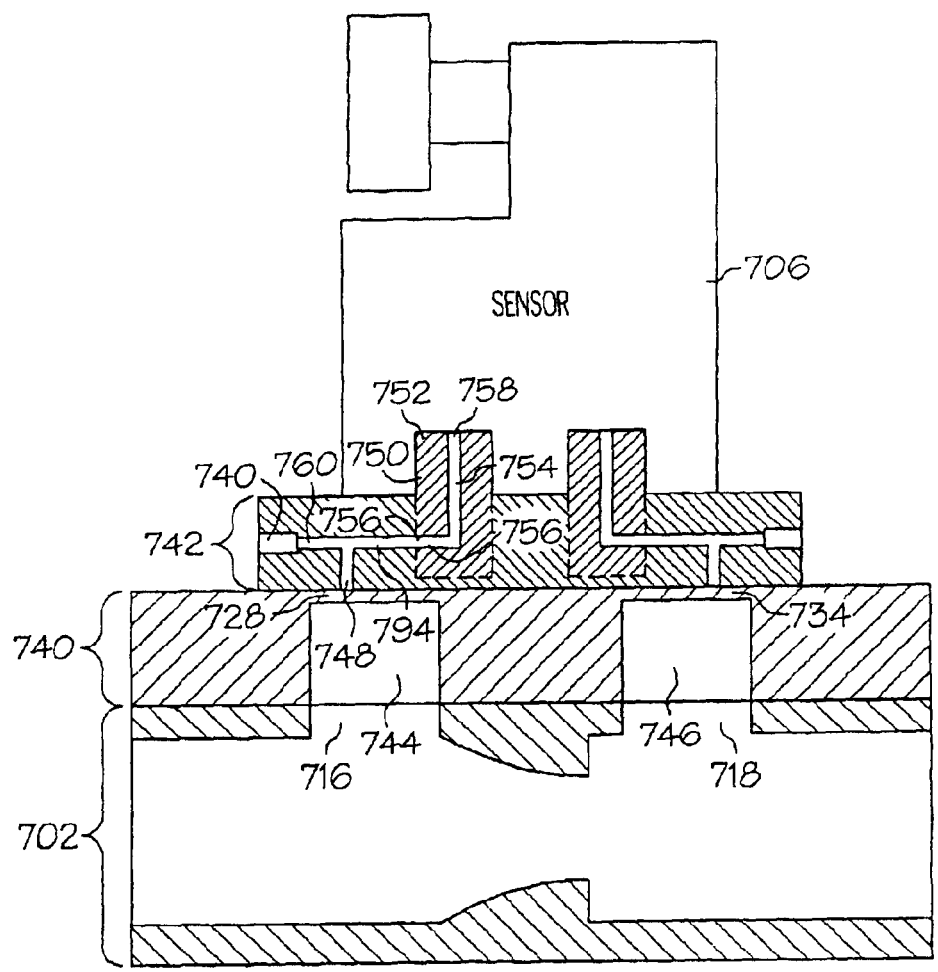
FIG. 8 is a partial cross-sectional view of the adapter taken along line 8—8 in FIG. 6.

In yet another embodiment as shown in FIGS. 7 and 8, the apparatus 700 includes a fluid line 702, an isolator plate 740 and an adapter plate 742. The fluid line 702 in this embodiment is, likewise, used to couple the sensor adapter 700 to a non-illustrated fluid system. Similarly, the isolator plate 740 is coupled to the fluid line 702 using any one of numerous means for coupling two pieces together including, but not limited to, an adhesive or two or more fasteners As shown in FIG. 8, the isolator plate 740 includes a first cavity 744 and a second cavity 746. In this embodiment, the first cavity 744 and second cavity 746 are dimensioned substantially similar and are substantially collocated with the first 716 and second 718 openings. The isolator plate 740 further includes a first isolator membrane 728 and a second isolator membrane 734 and are integrally formed as part of the isolator plate 740. The first isolator membrane 728 is located proximate one end of the first cavity 744, while the second isolator membrane 734 is located proximate one end of the second cavity 746. As will be appreciated by one skilled in the art, the first 728 and second 734 isolator membranes may be located proximate the adapter plate 742. Other embodiments may locate the first 728 and second 734 isolator membranes proximate the isolator plate 740.

As depicted in FIG. 8, the adapter plate 742 includes a first fluid channel 794 that includes a first input port 748 and first output port 750. The first input port 748 is in fluid communication with the first isolator membrane 728. As shown in the embodiment in FIG. 8, a first spacer element 752 is preferably coupled within the first output port 750. The first spacer element 752 has a second fluid channel 754 that includes a second input port 756 and a second output port 758. The second input port 756 is in fluid communication with the first fluid channel 794 and configured to receive pressure transmission fluid from the first fluid channel 794 while the second output port 758 is adapted for coupling with a sensor 706. The spacer element 752 may be coupled to the sensor 706 in any one of numerous methods including, but not limited to, friction fitting or threading.

In this embodiment, the first fluid channel 794 also includes a second input port 760 that is used as a fill port to allow a pressure transmission fluid to be inserted into the first fluid channel 794. Once the pressure transmission fluid is fully inserted, the fill port 740 is closed off in an air-tight manner. Again, the pressure transmission fluid may be any one of numerous substantially incompressible fluids such as water or silicone oil.

Although the embodiment depicted in FIGS. 7 and 8 shows two total cavities, 744, 746 and two isolator membranes 728, 734, it is to be appreciated, as before, that the present invention is not limited to this configuration. For example, the present invention may include more than two total cavities and more than two isolator membranes or only one total cavity and a single isolator membrane. Further, although the embodiment depicted in FIG. 8 shows the flow bore as including a flow venturi, one skilled in the art will appreciate that the flow bore may instead include a flow orifice or a substantially straight bore. Thus, this embodiment may additionally be configured for measurement of various fluid parameters including, but not limited to, pressure, differential pressure, flow rate, density, and fluid level.

Figure 9:
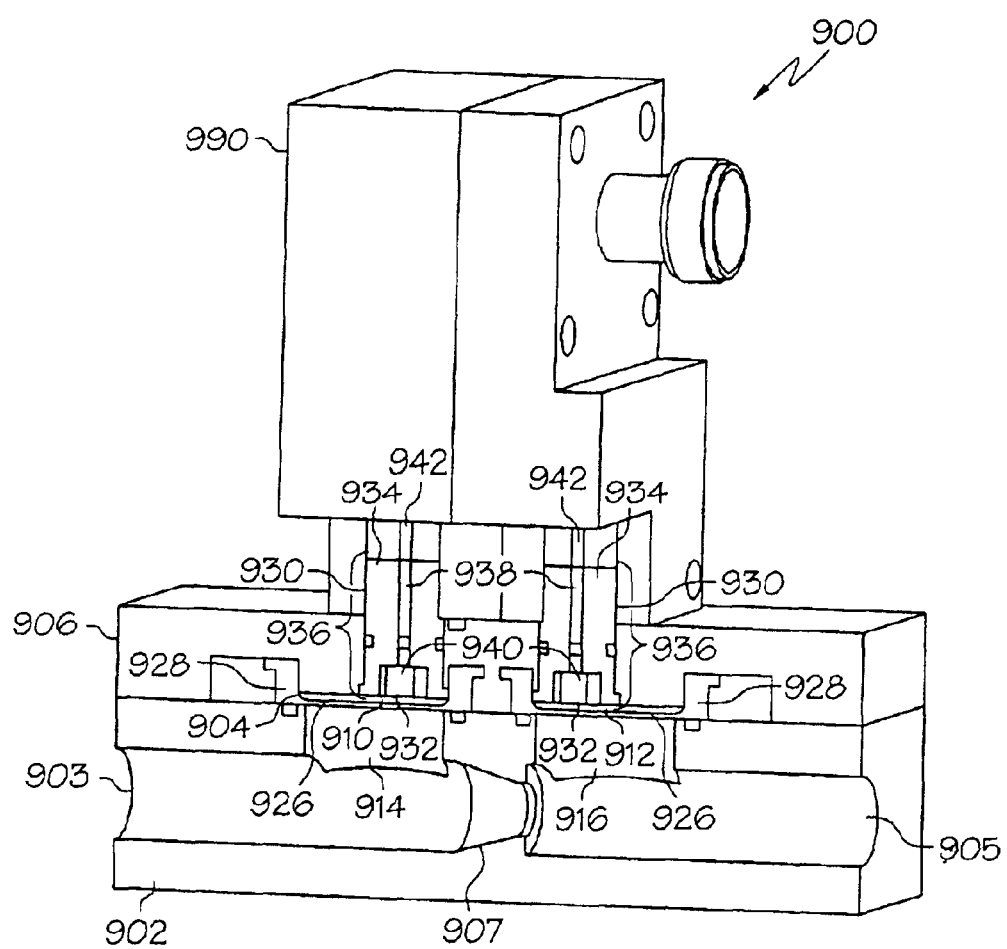
FIG. 9 is a perspective view of an adapter useful for coupling a sensor to a fluid system according to another embodiment of the present invention.
Figure 10:
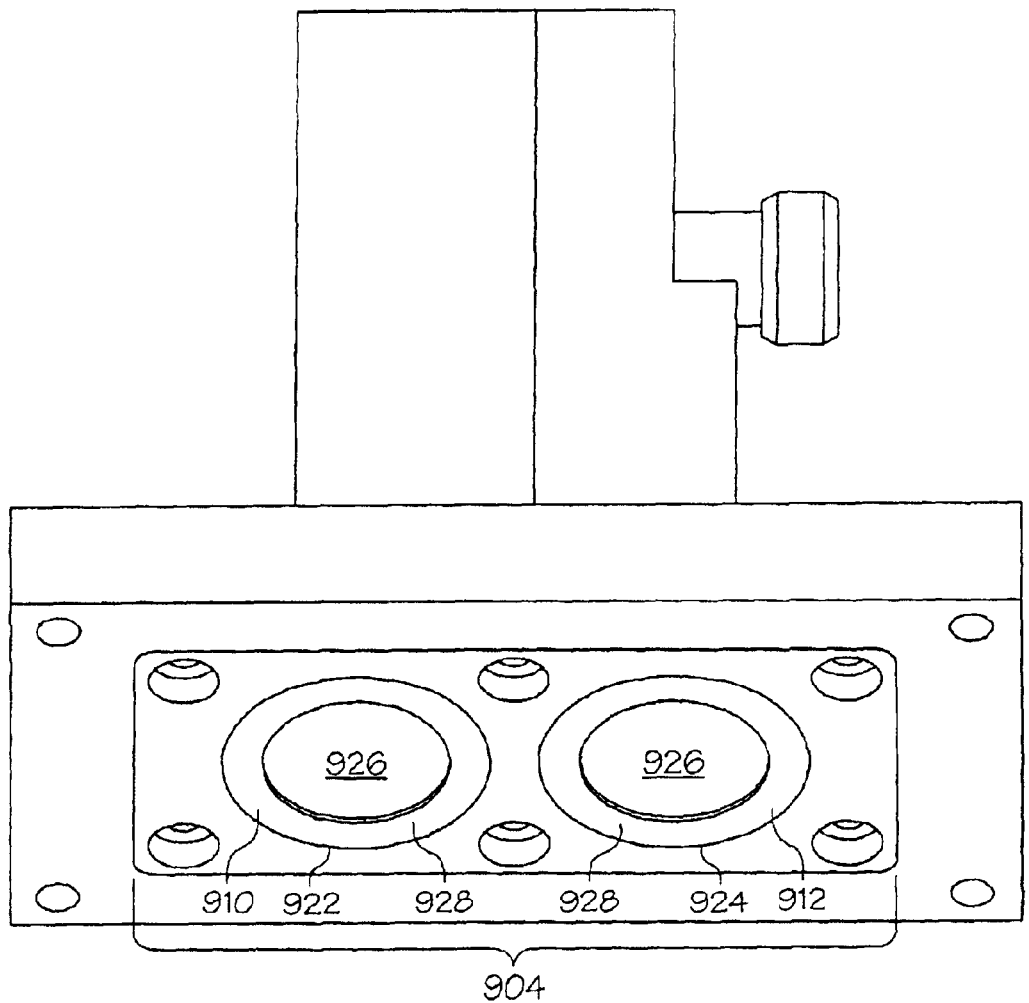
FIG. 10 is a cross sectional view of the diaphragm plate used in the embodiment of FIG. 9 with the fluid element removed.

In yet another embodiment of the present invention as shown in FIGS. 9 and 10, the apparatus 900 includes a fluid line 902, a retainer plate 904, first 910 and second diaphragms 912, and an adapter block 906. The fluid line 902, similar to the previously described embodiments, includes a fluid input port 903, a fluid output port 905, and a flow bore 907. In this embodiment, the flow bore 907, which extends from the input port 903 through to the output port 905 includes an integrally formed flow restriction. The fluid line 902 also includes a first opening 914 and a second opening 916. The openings 914, 916 communicate the fluid pressure in the fluid line 902 to an adapter block 906, which will be further described below.

Located proximate the fluid line 902 is a retainer plate 904. Shown in FIGS. 9 and 10, the retainer plate 904 includes a first opening 922 and a second opening 924. The first 922 and second 924 openings of the retainer plate 904 may contain a first 910 and a second 912 diaphragm. The diaphragms 910, 912 may be further comprised of a membrane portion 926 and a rim portion 928. The rim portion 928 surrounds the membrane portion 926 and is positioned between the retainer plate 904 and the adapter block 906. The rim portion 928 of the diaphragms 910, 912 are retained in place by the force exerted when the retainer plate 904 and adapter block 906 are compressed together. The retainer plate 904 can be secured to the adapter block 906 using any one of numerous means for coupling pieces together, including welding or adhesive coupling.

In the preferred embodiment, the first 910 and second 912 diaphragms may be separately molded or machined and may be constructed from Teflon-like material. Alternatively, the diaphragms 910, 912 may be formed out of the same material as the adapter block. Additionally, the membrane portion 926 of the diaphragms 910, 912 may include a plurality of convolutions on one or more of the membrane surfaces. The convolutions are useful for making the membrane portion 926 of the diaphragms 910, 912 more compliant for a given membrane thickness.

The adapter block 906 includes a first fluid channel 930 that includes a first input port 932 and a first output port 934. As depicted in FIG. 9, the first input port 932 is in fluid communication with the first diaphragm 910. A first spacer element 936 is coupled within the first output port 934 and is used to displace volume of the first fluid channel 930, such that the pressure transmission fluid need not fill the entire volume of the first fluid channel 930. The pressure transmission fluid may be any one of numerous substantially incompressible fluids such as water or oil. The first spacer element 936 has a second fluid channel 938 that includes a second input port 940 and a second output port 942. The second input port 940 is in fluid communication with the first fluid channel 930 and is configured in such a way as to receive pressure transmission fluid from the first fluid channel 930 while the second output port 942 is adapted for coupling with a sensor 990. The spacer element 936 may be coupled to the sensor 990 in any one of numerous methods including, but not limited to, friction fitting, threading or adhesive coupling. Thus, pressure variations in the fluid line 902 cause flexures of the membrane portion 926 of the diaphragms 910, 912. When the membrane portion 926 flexes, the pressure variation is transferred through the pressure transmission fluid to the sensor 990. The data may then be used to calculate various physical features of the fluid such as pressure, differential pressure, flow rate, density or fluid level.

Although the embodiment depicted in FIGS. 9 and 10 shows two total openings 922, 924 in the retainer plate 904 and two diaphragms 910, 912, it is to be appreciated that the present invention is not limited to this configuration. For example, the present invention may include more than two retainer plate openings and more than two diaphragms or only one total retainer plate opening and a single diaphragm. By the same token, even though FIGS. 9 and 10 show two first fluid channels, one skilled in the art knows that the present invention is not limited to two first fluid channels, but may include a single first fluid channel or more than two first fluid channels.

Further, although the embodiment depicted in FIG. 9 shows the flow bore as including a flow venturi, one skilled in the art will appreciate that the flow bore may instead include a flow orifice or a substantially straight bore.

The present invention is simple and low cost to manufacture. It is a reliable apparatus that not only is capable of measuring pressure or differential pressure, but is designed to allow for facilitating the measurement of multiple physical characteristics of a fluid. Additionally, the apparatus is media-compatible and has low potential for leakage. The invention performs its abilities while maintaining structural integrity.

While the invention has been described with reference to preferred embodiments, it will be understood by those skilled in the art that various changes may be made and equivalents may be substituted for elements thereof without departing from the scope of the invention. Therefore, it is intended that the invention not be limited to particular embodiments disclosed as the best mode contemplated for carrying out this invention, but that the invention will include all embodiments falling within the scope of the appended claims.

We claim:

1. An adapter for coupling a sensor to a fluid line (having at least a first opening) therein, the adapter comprising:
    an adapter block having a first fluid channel, a first input port, and a first output port;
    a retainer plate coupled to the adapter block, the retainer plate having at least a first opening therethrough;
    a first diaphragm having a first membrane portion and a first rim portion surrounding the first membrane portion, the first membrane portion positioned within the retainer plate first opening and the rim portion positioned between at least the adapter block and the retainer plate,
    wherein the first diaphragm is held in place by a compression force exerted between the adapter block and the retainer plate;
    a second fluid channel, a second input port, and a second output port formed in the adapter block;
    a second opening formed through the retained plate; and
    a second diaphragm having a second membrane portion and a second rim portion surrounding the second membrane portion, the second membrane portion positioned within the retainer plate second opening and the second rim portion positioned between at least the adapter block and the retainer plate,
    wherein the second diaphragm is held in place by a compression force exerted between the adapter block and the retainer plate.

2. The adapter of claim 1, further comprising:
    a second spacer element coupled within the second output port, the second spacer element having a third fluid channel including a second input port and a third output port, the third input port in fluid communication with the second fluid channel and the second output port adapted for coupling with a sensor.

3. The adapter of claim 1, wherein the first diaphragm is formed of the same material as the adapter block.

4. The adapter of claim 3, wherein:
    the first membrane includes a plurality of convolutions on one or more surfaces thereof.

5. The adapter of claim 1, wherein the second diaphragm is formed of the same material as the adapter block.

6. The adapter of claim 1, wherein:
    the second membrane includes a plurality of convolutions on one or more surfaces thereof.

7. The adapter of claim 1, wherein the first diaphragm is formed of different material than the adapter block.

8. The adapter of claim 1, wherein the second diaphragm is formed of different material than the adapter block.

9. The adapter of claim 1 wherein:
    the fluid line includes a fluid input port and a fluid output port and a flow bore extending from the fluid input port to the fluid output port.

10. The adapter of claim 9 wherein:
    the flow bore of the fluid line includes an integral flow orifice.

11. The adapter of claim 9 wherein:
    the flow bore of the fluid line includes an integral flow venturi.

12. The adapter of claim 9 wherein:
    the bore of the fluid line is a substantially straight bore.

13. The adapter of claim 1 wherein:
    the one or more membranes includes a plurality of convolutions on one or more surfaces thereof.

14. An adapter for coupling a sensor to a fluid system, comprising:
    a fluid line including a fluid input port, a fluid output port, and a flow bore extending from the fluid input port to the fluid output port, the fluid line further including a first opening extending from the flow bore to a surface of the fluid line between the fluid input port and fluid output port;
    an isolator block having a first cavity and having a second cavity formed in a surface of the isolator block, wherein the surface of the isolator block is coupled to the surface of the fluid line such that the second cavity is in fluid communication with the first opening in the fluid line; and
    a first flexible membrane formed in the isolator block and physically separating the first cavity from the second cavity, wherein the first flexible membrane transfers a pressure between the second cavity and first cavity.

15. The adapter of claim 14 wherein:
    the first flexible membrane is integrally molded with the isolator block.

16. The adapter of claim 14 wherein:
    the first flexible membrane is integrally machined into the isolator block.

17. The apparatus of claim 14 wherein:
    the first flexible membrane includes a plurality of convolutions on one or more surfaces thereof.

18. The adapter of claim 14 wherein:
    the flow bore of the fluid line includes an integral flow orifice.

19. The adapter of claim 14 wherein:
    the flow bore of the fluid line includes an integral flow venturi.

20. The adapter of claim 14 wherein:
    the flow bore of the fluid line is a substantially straight bore.

21. The adapter of claim 14, further comprising:
    a third cavity and a fourth cavity formed in the isolator block, the fourth cavity adapted for fluidly coupling to a second opening in the fluid line; and
    a second membrane integrally formed as part of the isolator block and physically separating the third cavity and the fourth cavity.

22. The adapter of claim 21 wherein:
    the second membrane is integrally molded with the isolator block.

23. The apparatus of claim 21 wherein:
    the second membrane is integrally machined into the isolator block.

24. The adapter of claim 21 wherein:
    the second membrane includes a plurality of convolutions on one or more surfaces thereof.

25. An adapter for coupling a sensor to a fluid system, comprising:
    a fluid line including a fluid input port, a fluid output port, and a flow bore extending from the fluid input port to the fluid output port, the fluid line further including a first opening extending from the flow bore to a surface of the fluid line between the fluid input port and fluid output port;

an isolator block having a first cavity and having a second cavity formed in a surface of the isolator block, wherein the surface of the isolator block is coupled to the surface of the fluid line such that the second cavity is in fluid communication with the first opening in the fluid line;

a first membrane formed in the isolator block and physically separating the first cavity from the second cavity, wherein the first membrane transfers a pressure between the second cavity and the first cavity;

a first spacer element having one or more openings extending therethrough from a first surface to a second surface, the first spacer element coupled within the first cavity such that one of its first and second surfaces is positioned proximate the first membrane; and a sensor in fluid communication with one of the openings in the first spacer element.

26. The adapter of claim 25 wherein:
the first membrane is integrally molded with the isolator block.

27. The adapter of claim 25 wherein:
the first membrane is integrally machined into the isolator block.

28. The adapter of claim 25 wherein:
the first membrane includes a plurality of convolutions on one or more surfaces thereof.

29. The adapter of claim 25 wherein:
the sensor comprises a pressure sensor.

30. The adapter of claim 25 wherein:
the flow bore of the fluid line includes an integral flow orifice.

31. The adapter of claim 25 wherein:
the flow bore of the fluid line includes an integral flow venturi.

32. The adapter of claim 25 wherein:
the flow bore of the fluid line is a substantially straight bore.

33. The adapter of claim 25 wherein:
another one of the first and second openings of the first spacer element is a fill port for inserting a pressure transmission fluid.

34. The adapter of claim 25, further comprising:
a third cavity and a fourth cavity formed in the isolator block, the fourth cavity adapted for fluidly coupling to a second opening in the fluid line; and
a second membrane integrally formed as part of the isolator block and physically separating the third cavity and the fourth cavity.

35. The adapter of claim 34 wherein:
the second membrane is integrally molded with the isolator block.

36. The adapter of claim 34 wherein:
the second membrane is integrally machined into the isolator block.

37. The adapter of claim 34 wherein:
the second membrane includes a plurality of convolutions on one or more surfaces thereof.

38. The adapter of claim 34, further comprising:
a second spacer element having one or more openings extending therethrough from a third surface to a fourth surface, the second spacer element coupled within the third cavity such that one of its third and fourth surfaces is positioned proximate the second membrane,
wherein the sensor is in fluid communication with one of the openings in the second spacer element.

39. An apparatus for sensing one or more physical characteristics of a fluid, comprising:
a fluid line including a fluid input port, a fluid output port, and a flow bore extending from the fluid input port to the fluid output port, the fluid line further including a first opening and a second opening spaced apart from the first opening, each of the first and second openings extending from the flow bore to a surface thereof an isolator block having at least a first cavity, a second cavity, a third cavity and a fourth cavity formed therein, the second cavity and fourth cavity each adapted for fluidly coupling to the first opening and a second opening, respectively, in the fluid line;

a first membrane integrally formed as part of the isolator block and physically separating the first cavity from the second cavity;

a second membrane integrally formed as part of the isolator block and physically separating the third cavity from the fourth cavity;

a first spacer element having one or more openings extending therethrough from a first surface to a second surface, the first spacer element coupled within the first cavity such that one of its first and second surfaces is positioned proximate the first membrane;

second spacer element having one or more openings extending therethrough from a third surface to a fourth surface, the second spacer element coupled within the third cavity such that one of its third and fourth surfaces is positioned proximate the second membrane; and a sensor in fluid communication with one of the openings in the first spacer element and in fluid communication with one of the openings in the second spacer element.

40. An apparatus for sensing one or more physical characteristics of a fluid, comprising:
an isolator plate having at least a first cavity formed therein adapted for fluidly coupling to a first opening in a fluid line and a second cavity formed therein adapted for fluidly coupling to a second opening in the fluid line;

at least a first membrane integrally formed as part of the isolator plate and positioned proximate one end of the first cavity and at least a second membrane integrally formed as part of the isolator plate and positioned proximate one end of the second cavity;

an adapter plate coupled to the isolator plate, the adapter plate having a first fluid channel having a first input port in fluid communication with the first membrane and a first output port, the adapter plate including a third fluid channel having a third input port in fluid communication with the second membrane and a third output port;

a first spacer element coupled within the first output port, the first spacer element having a second fluid channel including a second input port in fluid communication with the first fluid channel and a second output port;

a second spacer element coupled within the third output port, the second spacer element having a fourth fluid channel including a fourth input port in fluid communication with the third fluid channel and a fourth output port adapted for coupling with the sensor; and a sensor in fluid communication with the second output port and the fourth output port.

41. An apparatus for sensing a physical state of fluid which flows at least from a first point to second point along a fluid line, comprising:
an isolator block having a first cavity formed in a surface of the isolator block, wherein the surface of the isolator block is coupled to a surface of the fluid line such that the first cavity is diposed over a first opening in the fluid line which is located on the surface of the fluid line between the first and second points of the fluid line;

a first membrane formed in the first cavity of the isolator block, wherein a pressure from the fluid line is transferred across the first membrane; and a sensor having a first inlet coupled to a first outlet of the isolator block which is connected by a first channel to a surface of the first membrane opposite from the fluid line.

42. The apparatus of claim 41, wherein the isolator block further includes a second cavity formed in the surface of the isolator block and disposed over a second opening in the fluid line along the surface of the fluid line between the first and second points of the fluid line.

43. The apparatus of claim 42, further including a second membrane formed in the second cavity of the isolator block.

44. The apparatus of claim 43, wherein the sensor has a second inlet coupled to a second outlet of the isolator block which is connected by a second channel to a surface of the second membrane opposite from the fluid line.

45. The apparatus of claim 41, further including an adaptor block coupled between the isolator block and the sensor.

46. The apparatus of claim 41, wherein the first surface of the isolator block and the surface of the fluid line are substantially flat.

* * * * *

UNITED STATES PATENT AND TRADEMARK OFFICE
CERTIFICATE OF CORRECTION

PATENT NO.   : 6,920,795 B2
DATED        : July 26, 2005
INVENTOR(S)  : Brian Bischoff et al.

It is certified that error appears in the above-identified patent and that said Letters Patent is hereby corrected as shown below:

Column 9,
Line 26, change "retained" to -- retainer --.
Line 39, change "including a second" to -- including a third --.

Column 12,
Line 25, add the word -- a -- before the words "second spacer".
Line 63, add the word -- a -- between "to" and "second".

Signed and Sealed this

Twenty-seventh Day of September, 2005

JON W. DUDAS
*Director of the United States Patent and Trademark Office*